United States Patent
Kelley

(10) Patent No.: US 9,097,609 B1
(45) Date of Patent: Aug. 4, 2015

(54) HERMETIC SEAL LEAK DETECTION APPARATUS WITH VARIABLE SIZE TEST CHAMBER

(71) Applicant: The United States of America as represented by the Administrator of the National Aeronautics and Space Administration, Washington, DC (US)

(72) Inventor: Anthony R. Kelley, Somerville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 219 days.

(21) Appl. No.: 13/874,182

(22) Filed: Apr. 30, 2013

(51) Int. Cl.
G01M 3/34 (2006.01)
G01M 3/32 (2006.01)

(52) U.S. Cl.
CPC .................................... G01M 3/32 (2013.01)

(58) Field of Classification Search
CPC .......... G01M 3/02; G01M 3/329; G01M 3/34
USPC .............. 73/37, 40, 40.7, 49.3, 49.8
See application file for complete search history.

(56) References Cited

U.S. PATENT DOCUMENTS

| | | | | |
|---|---|---|---|---|
| 5,821,147 A | * | 10/1998 | Kizilyalli | 438/305 |
| 5,843,140 A | * | 12/1998 | Strojnik | 607/36 |
| 6,439,033 B1 | * | 8/2002 | Lehmann | 73/49.3 |
| 6,584,828 B2 | * | 7/2003 | Sagi et al. | 73/40 |
| 6,829,936 B2 | * | 12/2004 | Lehmann | 73/493 |
| 7,062,012 B1 | * | 6/2006 | Chng et al. | 378/57 |
| 7,290,439 B2 | * | 11/2007 | Perkins et al. | 73/40.7 |
| 7,320,243 B2 | * | 1/2008 | Perkins et al. | 73/40.7 |
| 7,571,636 B2 | * | 8/2009 | Mayer | 73/49.3 |
| 7,578,170 B2 | * | 8/2009 | Mayer et al. | 73/49.3 |
| 7,621,623 B2 | * | 11/2009 | Umeda | 347/68 |
| 8,448,498 B1 | * | 5/2013 | Kelley | 73/49.3 |
| 2003/0181794 A1 | * | 9/2003 | Rini et al. | 600/300 |
| 2005/0079620 A1 | * | 4/2005 | Eberhard et al. | 436/1 |
| 2006/0260713 A1 | * | 11/2006 | Pyszczek et al. | 141/311 R |
| 2010/0050747 A1 | * | 3/2010 | Hua et al. | 73/40 |
| 2014/0311222 A1 | * | 10/2014 | Decker et al. | 73/40 |

* cited by examiner

*Primary Examiner* — Laura Martin
*Assistant Examiner* — Samir M Shah
(74) *Attorney, Agent, or Firm* — Absolute Technology Law Group, LLC; James J. McGroary

(57) ABSTRACT

The present invention is a versatile hermetic seal leak detection apparatus for testing hermetically sealed containers and devices for leaks without the need to create a custom or specially manufactured testing chamber conforming to the dimensions of the specific object under test. The size of the testing chamber may be mechanically adjusted by the novel use of bellows to reduce and optimize the amount of gas space in a test chamber which surrounds the hermetically sealed object under test. The present invention allows the size of the test chamber to be selectively adjusted during testing to provide an optimum test chamber gas space. The present invention may be further adapted to isolate and test specific portions of the hermetically sealed object under test for leaks.

20 Claims, 8 Drawing Sheets

HERMETIC SEAL LEAK DETECTION APPARATUS WITH VARIABLE SIZE TEST CHAMBER

FEDERAL RESEARCH STATEMENT

The invention described herein was made by an employee of the United States Government and may be manufactured and used by or for the Government of the United States of America for governmental purposes without the payment of any royalties thereon or therefore.

CLAIM OF PRIORITY

The present application claims priority to U.S. patent application Ser. No. 12/870,468 entitled "Hermetic Seal Leak Detection Apparatus" filed on Aug. 27, 2010, which was subject to restriction. Applicant withdrew claims 10-13, the subject matter of which is now claimed in this application.

The following statement is included pursuant to MPEP form paragraph 2.10.01:

Applicant states that this application claims the subject matter of a divisional application of the prior-filed application. A continuation or divisional application cannot include new matter. Applicant is therefore identifying the following matter not disclosed in the prior-filed application as the following paragraphs: 001, 003, 015-018, 022-029, and 043-060 and abstract.

U.S. patent application Ser. No. 12/870,468 is incorporated by reference, and priority to the subject matter of the prior application is claimed to the extent permitted by law.

FIELD OF THE INVENTION

This invention relates generally to the field of testing and measuring seals for leaks, and more specifically to a hermetic seal leak detection apparatus with test chamber size that can be selectively varied by mechanical actuation.

BACKGROUND OF THE INVENTION

The hermetic seal on shuttle rocket booster (SRB) pressure sensors cannot be easily tested for leaks. Currently, if a leak is suspected in one of these hermetic seals, the seal can be tested only by traditional seal leak evaluation methods, which may require disassembling the transducer or some other form of destructive testing. With SRB pressure sensors in limited supply, disassembly or destructive testing is not favorable.

Other instruments, as well as consumer products (e.g., vitamins, milk, etc.), contain hermetic seals that may need to be tested for leaks. Presently, most seals are tested by introducing a foreign gas, such as helium. A hermetically sealed device is pressurized under vacuum conditions with helium for a period of time inside a vacuum tight chamber. If there is a leak in the seal, helium is forced into the sealed device. The vacuum chamber is then vented. The helium is then pulled out of the vacuum tight chamber, by vacuum pump, and a slight vacuum is pulled on the unit being tested. Any helium that was forced into the device as a result of a leaking seal will escape from the device in the lower pressure. A mass spectrometer is used to detect helium leaking from inside the hermetic seal under vacuum conditions.

This pressurized gas means of leak detection is problematic in many respects. First, it cannot be used to detect large leaks. When the pressurized helium (or other gas) is removed by vacuum pump, any helium escaping from a large seal leak will similarly be removed and no helium will show up on the mass spectrometer, resulting in a false reading that the seal is good. Second, the method requires the removal of gas permeable materials (e.g., soft components such as gaskets and grommets). Deconstruction of these devices, particularly SRB pressure sensors, to remove gas permeable materials is risky as gaskets and grommets can break or tear easily during removal. This method is also time-consuming, requiring multiple sessions of pressurizing, depressurizing, and observing. Further, there is the risk of contamination with whatever gas is chosen. Finally, mass spectrometers are very expensive, making this pressurized gas system of hermetic seal leak detection very expensive. Approximately $10,000 of hardware is needed for this method of testing.

Hermetic seals are alternatively tested by pressurizing the device being tested and then submerging it in a chemical bath. If there is a hole in the device, gas will enter the device when it is pressurized and escape into the lower pressure area when submerged. The escaping gas creates bubbles, which can be visually observed.

This pressure/submersion means of leak detection is also problematic in many of the same ways as the pressurized gas means of leak detection. First, all soft goods (e.g., gaskets and grommets) must be removed, leading to the same deconstruction problems observed with the pressurized gas means of leak detection. Second, if there is a leak in the device, there is the risk of contamination with the chemical when the device is submerged. This is particularly important for SRB pressure sensors, which cannot have moisture buildup or condensation on the interior of the sensor. This method is also time-consuming, requiring multiple steps and long periods of observation. Finally, this pressure/submersion means of leak detection requires not only vacuum chamber and pump devices, but also a chemical bath, making it just as costly as the pressurized gas means of leak detection.

It is desirable to have a simple, low-cost system for detecting hermetic seal leaks.

It is desirable to have a system for detecting hermetic seal leaks that eliminates the need for pressurizing gas.

It is desirable to have a system for detecting hermetic seal leaks that does not require disassembly or destruction of the unit/instrument before testing for a leak.

It is desirable to have a system for detecting hermetic seal leaks that is capable of detecting very small leaks, as well as large leaks.

It is desirable to have a system for detecting hermetic seal leaks that does not require the removal of gas permeable materials.

It is further desirable to have a system for detecting hermetic seal leaks which does not contaminate the unit being tested with helium or other detection gases or liquids.

It is further desirable to have a device which does not require manufacturing of a customized test chamber to achieve an optimum gas space around a container under test, and which may be economically adapted for a variety of hermetically sealed objects.

SUMMARY OF THE INVENTION

A vacuum tight test chamber is created around a hermetically sealed container being tested to minimize gas space outside of the hermetic seal. The size of the test chamber is optimized to decrease the amount of gas space around the container under test. An actuated bellows is used to vary the gas space, pressure and gas density and/or gas concentration of gas space of the variable size test chamber.

The pressure and gas density and/or gas concentration are then allowed to stabilize. If these stabilized values read close to a known good seal calibration, there is not a leak in the seal. If the stabilized values read closer to a known bad seal calibration value, there is a leak in the seal. These values may be read by a processing component and represented graphically as the slope of curve over time, and further processing hardware may deliver an audible or readable alert signal when a maximum acceptable slope value or calibrated value is exceeded.

Various methods for creating a differential in the reading pressure differential between the vacuum tight chamber and the unit being tested can be used. Either positive pressure or vacuum can be pulled on the unit being tested.

Because the seals are tested using pressure, density and gas concentration readings, no specific gas or mass spectrometer is needed. Large leaks are also easily identified, as a large leak will create a rapid depressurization, resulting in a rapidly stabilized pressure reading closer to the known bad seal calibration. Assuming room air is acceptable, there is no risk for contamination, and gas permeable materials do not need to be removed. The hermetic seal testing can be performed using any suitable gas compatible with the object under test.

It is important that the device is calibrated for known good and bad seals for the unit being tested in order to accurately interpret results. Calibration readings should be taken using the specific means by which the pressure differential in the vacuum tight chamber will be created. While seal leaks can be determined and measured with this device using the laws of thermodynamics including but not limited to the ideal gas laws, automating the system and performing calibrations while the device is in place in the system will provide greater control and quicker, more accurate calculations of leak size/rate.

GLOSSARY

Figure 1:
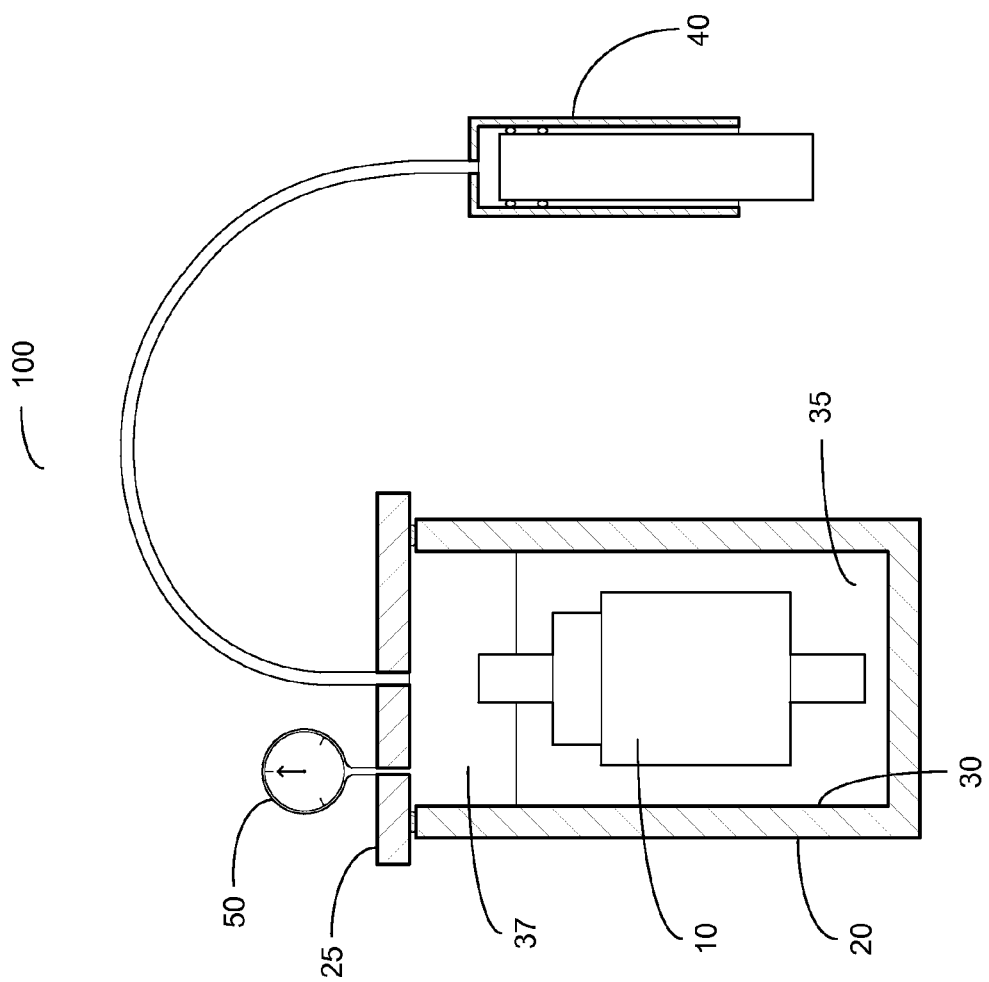
FIG. 1 illustrates a side view of an exemplary embodiment of a hermetic seal leak detection apparatus.

As used herein, the term "bellows" refers to an expandable vessel that can be compressed when pressure is applied to the outside of the vessel, or extended under vacuum, returning to its original shape when the pressure or vacuum is released. As used herein, the term bellows may include a non-pumping bellows. A bellows may further include plungers, pistons, positive displacement pumps, calibrated flow vacuum pumps, etc.

As used herein, the term "hollow structure" refers to a closed or partially closed component which contains empty space or gas, such as air.

As used herein, the term "pressure sensing bellows" refers to a chamber having a flexible wall constructed from a plurality of jointed segments, and a non-flexible base and non-flexible top structure, wherein the bottom and top structures are used to seal an object inside a sealed chamber during a pressure sensing operation wherein the bellows are compressed.

As used herein, the term "pressure" means any change in the pressure of a test chamber gas space which may be detected by sensors a reading of pressure, density and/or gas composition.

As used herein, the term "sealing component" or "partition" refers to component that closes, seals, impedes, partitions or reduces the area of a gas space. A sealing or partition component may be movable or non-movable and fixedly or selectively attached.

As used herein, the term "vacuum inducing device" refers to a component capable of changing the volume inside a sealed chamber resulting in an internal gas pressure change. Examples of a vacuum inducing device include but are not limited to diaphragms, bellows, plungers, pistons, positive displacement pumps, calibrated flow vacuum pumps, etc.

DETAILED DESCRIPTION

For the purpose of promoting an understanding of the present invention, references are made in the text to exemplary embodiments of a hermetic seal leak detection apparatus, only some of which are described herein. It should be understood that no limitations on the scope of the invention are intended by describing these exemplary embodiments. One of ordinary skill in the art will readily appreciate that alternate but functionally equivalent materials, components, and placement may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of hermetic seal leak detection apparatus 100 comprised of sealed pipe 20, plate 25, and vacuum inducing device 40. In the embodiment shown, sealed pipe 20 has three sides which enclose test chamber 30. The fourth side of test chamber 30 of sealed pipe 20 is enclosed by plate 25. Test chamber 30 of sealed pipe 20 is capable of handling a vacuum or positive pressure when plate 25 is in position. In the embodiment shown, vacuum inducing device 40 is a plunger; however, in various embodiments, vacuum inducing device 40 may be any device capable of changing the volume enclosed inside test chamber 30 resulting in an internal gas pressure change.

Hermetically sealed object under test 10 is placed inside sealed pipe 20. The interior of sealed pipe 20 further includes a non-gas permeable material 35 that fills and minimizes the volume of gas space 37 which surrounds hermetically sealed object under test 10. Non-gas permeable material 35 improves the accuracy and leak detection sensitivity of hermetic seal leak detection apparatus 100. To reduce the size of gas space 37, vacuum inducing device 40 is moved toward hermetically sealed object under test 10. To increase the size of gas space 37, vacuum inducing device 40 is moved away from hermetically sealed object under test 10 toward plate 25. When vacuum inducing device 40 is moved away from hermetically sealed device 10, a slight vacuum is pulled on hermetically sealed object under test 10. The resulting changes in pressure can be measured by any type of pressure or strain stressing instrument.

Pressure sensing instrument 50 is connected on one end to test chamber 30 causing it to react to a change in pressure in test chamber 30. When vacuum inducing device 40 is moved away from hermetically sealed object under test 10, pressure sensing instrument 50 will react to the slight vacuum being pulled on test chamber 30 and on hermetically sealed object under test 10. If hermetically sealed object under test 10 does not have a leak, the pressure in test chamber 30 will stabilize at a larger absolute pressure value in test chamber 30. If there is a leak in hermetically sealed object under test 10, gas will escape from hermetically sealed object under test 10 into gas space 37 resulting in a lower absolute pressure value in test chamber 30. If hermetically sealed object under test 10 has a large leak, the pressure inside test chamber 30 will stabilize quicker than if hermetically sealed object under test 10 has a small leak. The speed at which the pressure inside test chamber 30 stabilizes can be measured and used to determine the size of the leak. The size of the leak may also be determined by varying the speed of vacuum inducing device 40 and monitoring the transient speed of the resulting pressure change over time.

Alternatively, hermetically sealed object under test 10 can be tested for leaks by reducing gas space 37. If gas space 37 is reduced by moving vacuum inducing device 40 toward hermetically sealed object under test 10, a slight positive pressure will occur in test chamber 30. Pressure sensing instrument 50 will react to the increase in pressure in test chamber 30 by indicating a positive pressure. If hermetically sealed object under test 10 does not have a leak, the pressure in test chamber 30 will stabilize at a higher pressure value indicated in test chamber 30. If there is a leak in hermetic seal object under test 10, gas will be forced into hermetically sealed object under test 10 and the pressure inside test chamber 30 will stabilize at a lower pressure value than in the case without a leak. The speed at which the pressure inside test chamber 30 stabilizes can be measured and used to determine the size of the leak. The size of the leak may also be determined by varying the speed of vacuum inducing device 40 and monitoring the transient speed of the resulting pressure change over time.

The smaller gas space 37, the more sensitive hermetic seal leak detection apparatus 100 will be to gas volume changes and resulting pressure changes in detecting and characterizing leaks. Test chamber 30 may be created specifically to fit around a particular hermetic seal device. This is especially desirable if the hermetic seal device requires frequent testing. Alternatively, material that is impermeable to gas 35 may be placed in test chamber 30 around the hermetically sealed object under test 10 to decrease gas space 37, resulting in increased leak detection and leak characterization sensitivity. Alternatively, a smaller hermetic seal leak detection apparatus could be used.

In various embodiments, pressure sensing instrument 50 is known in the art and may be used to read changes in pressure inside test chamber 30. In other embodiments, strain gauges or gas density monitoring devices such as laser densitometers could be used for leak detection and characterization with comparable results. In various embodiments, a computerized data logging system may be used to monitor the response, i.e., change in pressure, over time. In other embodiments, a meter or an oscilloscope electronic data acquisition device may be used or the readings of a mechanical pressure sensing instrument may be manually recorded.

In various embodiments, sealed pipe 20 and/or plate 25 may further include optional electrical feedthroughs (i.e., sealed electrical connections) that allow functional testing at various pressure conditions.

Figure 2:
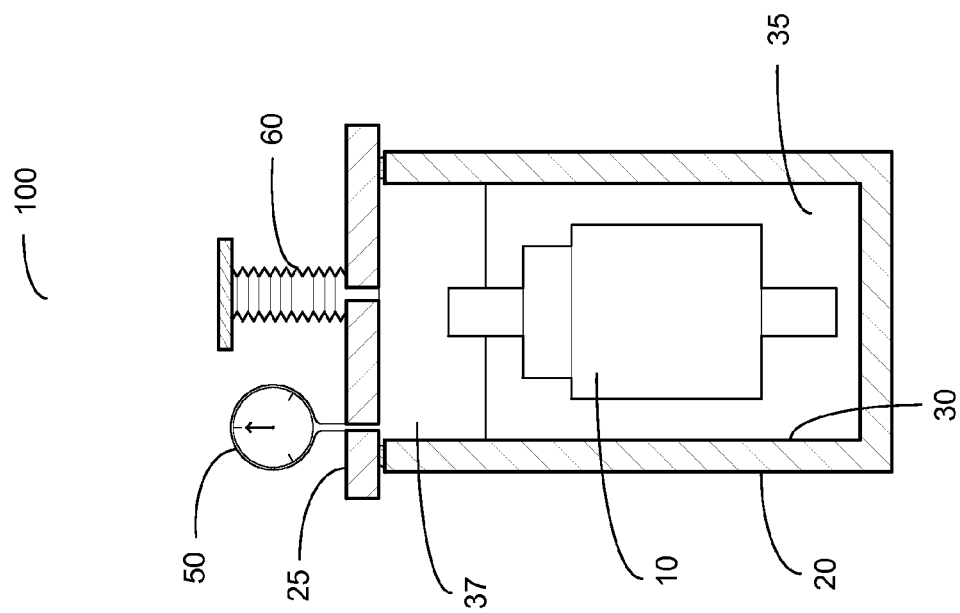
FIG. 2 illustrates a side view of a second exemplary embodiment of a hermetic seal leak detection apparatus.

FIG. 2 illustrates a side view of a second exemplary embodiment of hermetic seal leak detection apparatus 100. In the embodiment shown, bellows 60 is used to increase/decrease the volume of gas space 37 in test chamber 30, creating a negative/positive pressure in test chamber 30. Bellows 60 allows for more precise control in the adjustment of the volume of gas space 37.

Figure 3:
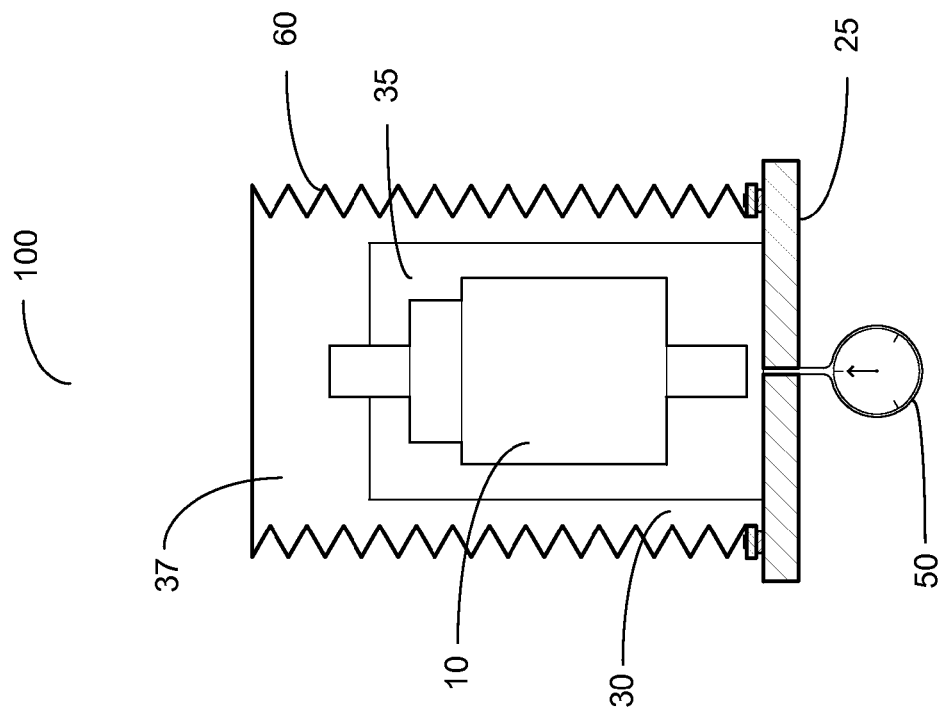
FIG. 3 illustrates a side view of a third exemplary embodiment of a hermetic seal leak detection apparatus.

FIG. 3 illustrates a side view of a third exemplary embodiment of hermetic seal leak detection apparatus 100. Visible in FIG. 3 is bellows 60, which is flexible and capable of being expanded and contracted. Expanding and contracting bellows 60 increases or decreases the amount of gas space 37 in test chamber 30 resulting in a corresponding pressure change. This is a simplified embodiment that omits the need for sealed pipe 20 (shown in FIGS. 1 and 2).

The expansion and contraction of bellows 60 creates a pressure change which is referred to as a positive or negative pressure in test chamber 30. A positive pressure is a pressure rating relative to atmospheric conditions with a psi measurement of greater than zero. A negative pressure has a psi measurement of less than zero gauge pressure, creating a vacuum. Bellows 60 allows for more precise control in the adjustment of the volume of gas space 37 and in various embodiments allows the size of the gas space chamber to be varied when actuated or moved.

In the embodiment shown, the top end of bellows 60 is welded shut and the bottom end of bellows 60 is clamped to plate 25. In other embodiments, bellows 60 is sealed using another means known in the art.

In various other embodiments, the pressure inside test chamber 30 can also be changed by heating and/or cooling sealed pipe 20. Creating a change in pressure in test chamber 30 by changing the internal volume of gas space 37 or by changing the temperature inside test chamber 30 allows a hermetic seal object under test 10 to be tested for leaks without using a vacuum pump to remove molecules from test chamber 30. The change in pressure that results from a change in the volume or temperature in test chamber 30 can be accurately measured. In contrast, it is difficult to determine the exact amount of gas removed from an area using a vacuum pump.

In various other embodiments, hermetic seal leak detection apparatus 100 may be automated by attaching a lever to one end of bellows 60 or vacuum inducing device 40 with a mechanical stop so that the volume of test chamber 30 and gas space 37 are changed by the same amount every time. The pressure readings for a known good seal should be the same for a given volume change.

FIGS. 4a through 4e illustrate various side sectional views of an exemplary embodiment of flexible chamber leak detection apparatus 100 which has a dual pressure chamber configuration and a variable size gas chamber. The dual housing configuration may be used to isolate a leak in the upper gas space chamber 37a and lower gas space chamber 37b.

Figure 4A:
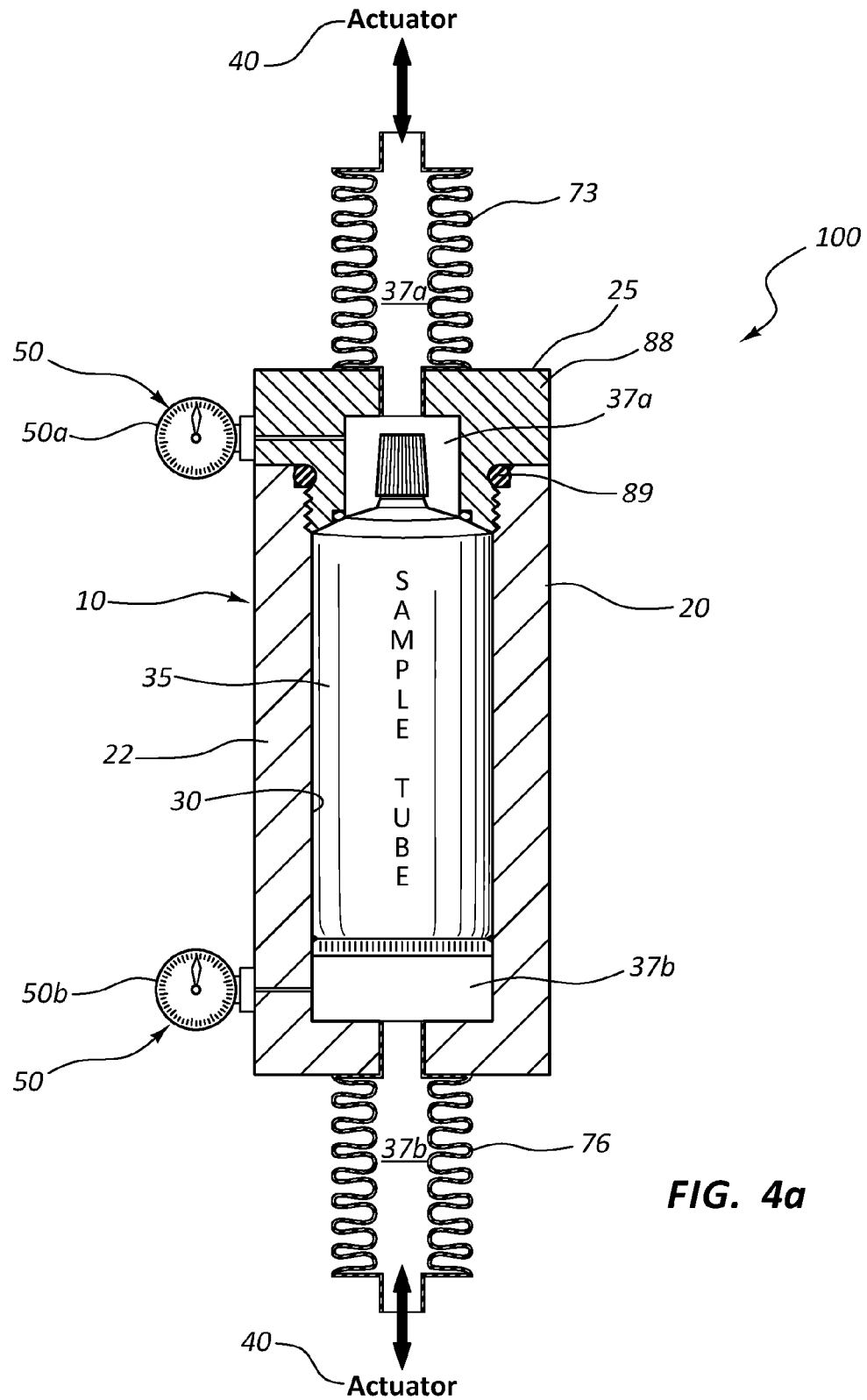
FIGS. 4a through 4e illustrate side views of alternative configurations of an exemplary embodiment of a hermetic seal leak detection apparatus with variable gas space chamber.

FIG. 4a is a side sectional view of flexible chamber hermetic seal leak detection apparatus 100 in a non-pressurized state, where no pressure is applied to the bellows.

As illustrated in FIG. 4a, flexible chamber leak detection apparatus 100 includes flexible housing 22 which encloses upper gas space chamber 37a and lower gas space chamber 37b. In various embodiments, flexible housing 22 may be structurally and functionally constructed and integrated with actuated upper bellows 73 and lower bellows 76. Various embodiments may utilize one bellows as flexible chamber or a pair of bellows in conjunction with flexible chamber 22.

In the embodiment shown, flexible gas chamber is disposed between upper pressure sensing bellows 73 and lower pressure sensing bellows 76 which are used to apply pressure to upper gas space chamber 37a and lower gas space chamber 37b. In the embodiment shown, flexible housing 22 is all constructed as a plurality of jointed segments fixedly or selectively attached to a non-flexible base and non-flexible top structure, wherein the bottom and top structures are used to seal a flexible housing 22 during a pressure sensing operation during which bellows 73 and 76 are compressed.

In the embodiment shown, bellows 73 and 76 are known in the art and of the type commercially available from Senior Aerospace located in Sharon, Mass.

In the embodiment shown, hermetically sealed object under test 10 is a tube, which is placed into the flexible housing 22.

In the embodiment shown, chamber cap 88 with a cylindrical threaded section having a female thread to be screwed on the male thread of upper chamber with compression force to seal o-ring. In the embodiment shown, actuator 40 is used to apply to high pressure to the upper gas space chamber 37a and actuator 40 is used to apply low pressure to lower gas space chamber 37b.

In the embodiment shown, if the hermetically sealed object under test 10 leaks, lower gas space chamber 37b will have pressure decay as in hermetic seal leak detector. (Shown in FIG. 4b). The actuator pressure is then reversed. (Shown in FIG. 4c).

In the embodiment shown, hermetically sealed object under test 10 contains a thick fluid. Which requires a relatively high pressure move. Thick fluid which is hard to move requires more pressure.

Must minimize gas space around tube and cap. The size of the upper bellows 73 and lower bellows 76 may be chosen to make thick fluid move in both directions.

Figure 4B:
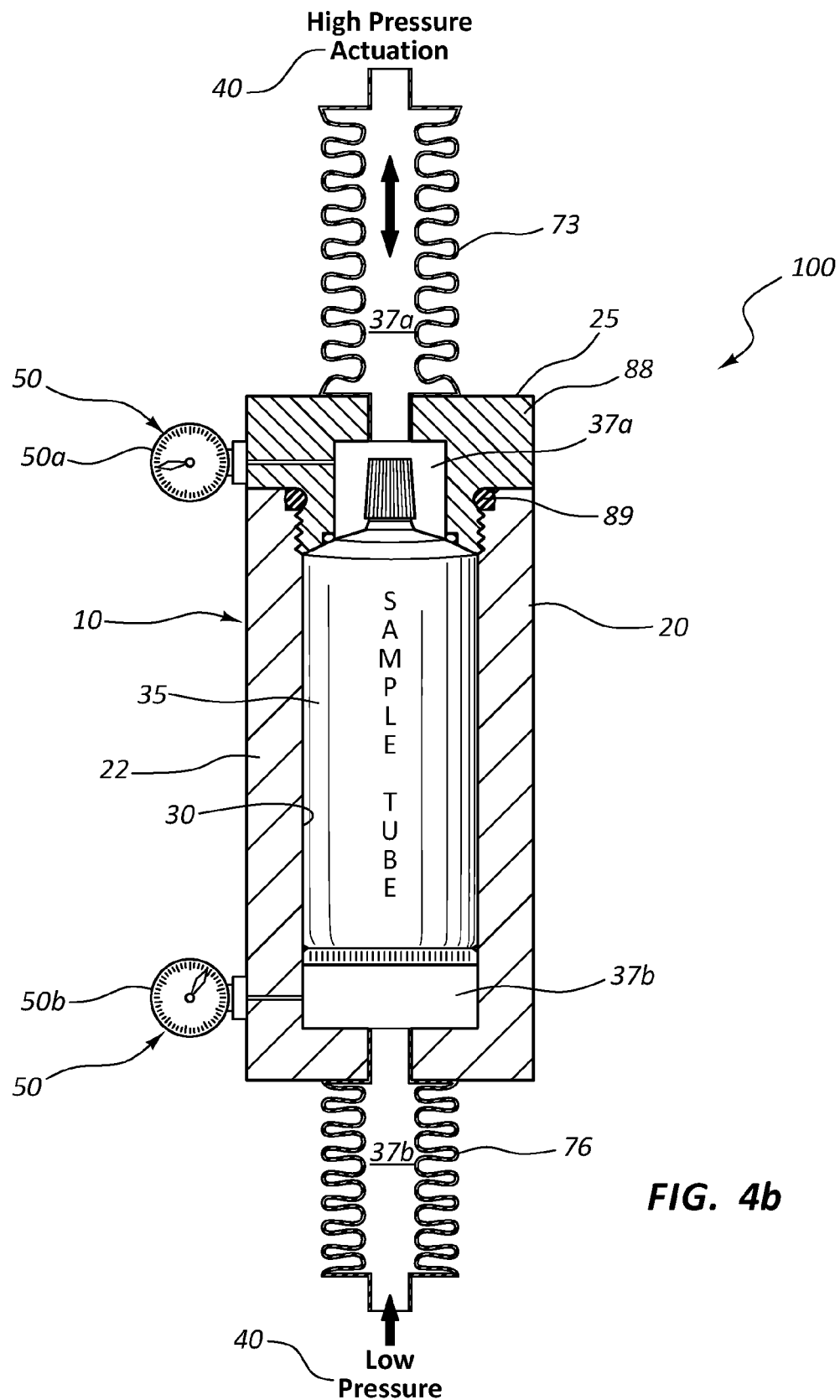

FIG. 4b illustrates flexible chamber leak detection apparatus 100 with high pressure actuation applied to the upper gas space chamber 37a and low pressure applied to the low gas space chamber 37b.

Figure 4C:
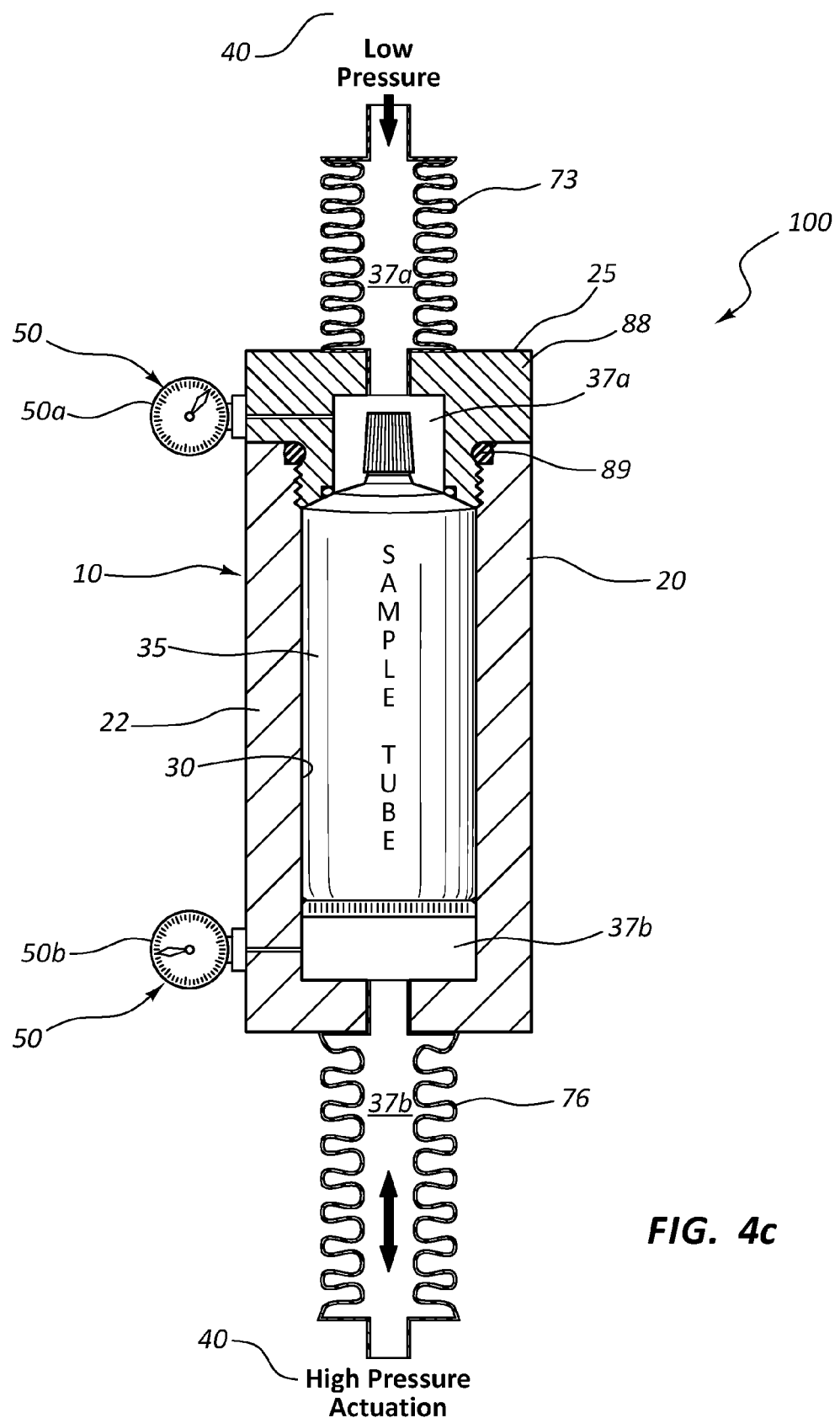

FIG. 4c illustrates flexible chamber leak detection apparatus 100 after the pressure has been reversed, and shows low pressure applied to the upper gas space chamber 37a and high pressure actuation applied to the lower gas space chamber 37b.

Figure 4D:
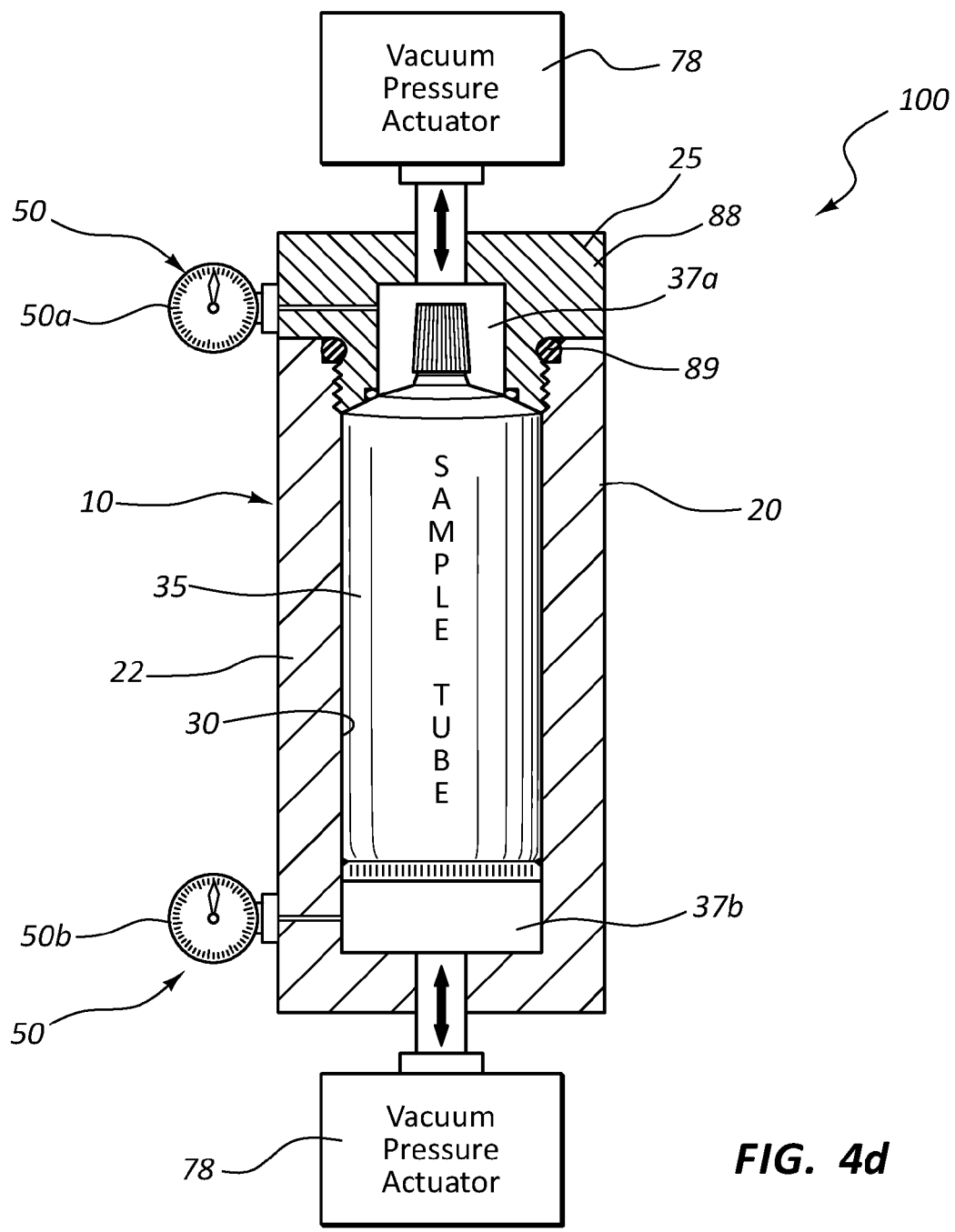

FIG. 4d illustrates an alternative embodiment of flexible chamber leak detection apparatus 100 which uses vacuum pressure actuators in place of the upper and lower bellows 73 and 76.

Figure 4E:
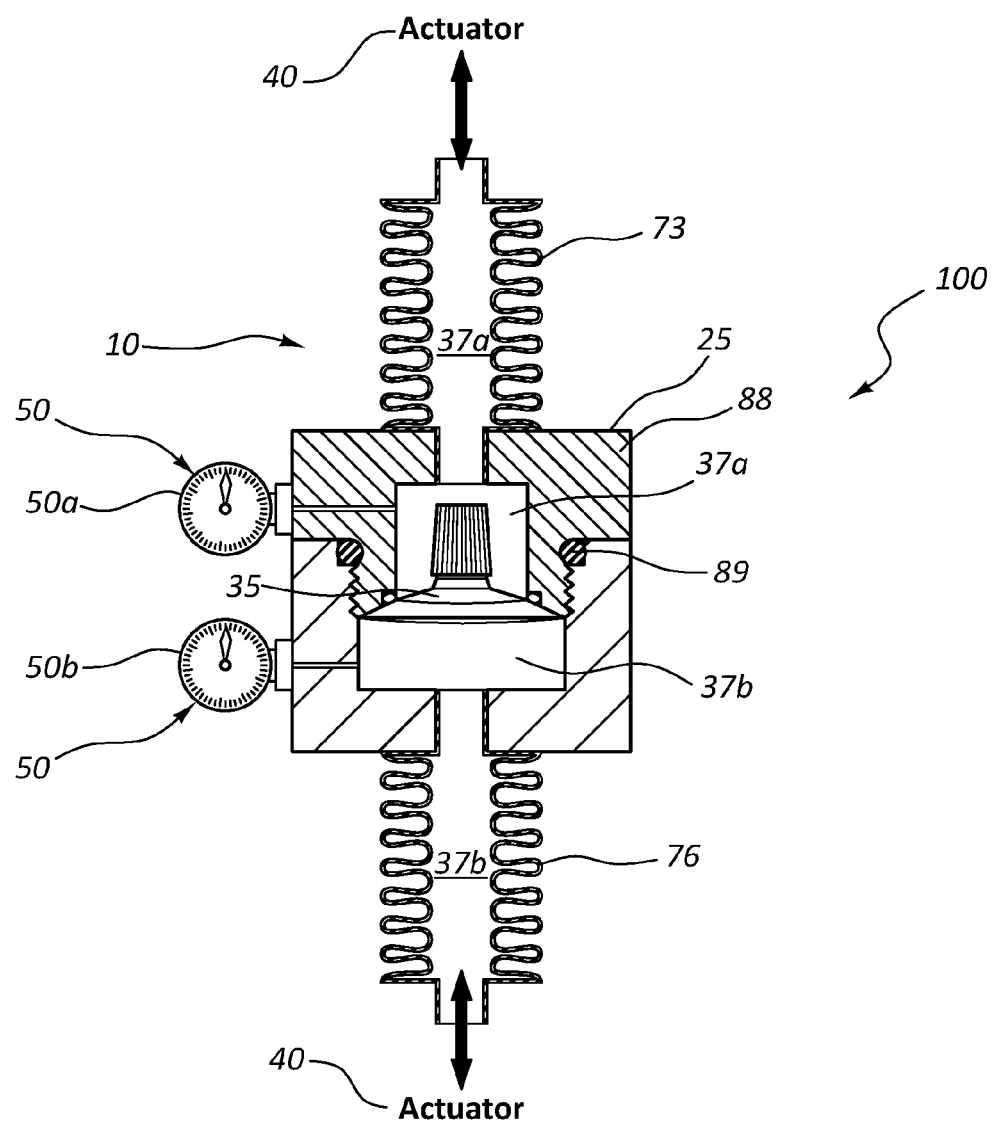

FIG. 4e illustrates an alternative embodiment of flexible chamber leak detection apparatus 100 in which only the chamber cap 88 of a hermetically sealed object under test 10 is being tested.

What is claimed is:

1. A hermetic seal leak detection apparatus comprised of:
    a hermetically sealed object under test wherein said hermetically sealed object under test has an internal test object pressure;
    at least one variable size gas space test chamber enclosed in a flexible housing which surrounds said hermetically sealed object under test, wherein said variable size gas space test chamber has a measurable test chamber pressure;
    at least one expandable and contractible bellows operatively coupled with said variable size gas space test chamber;
    wherein said at least one expandable and contractible bellows controls size of said variable size gas space chamber by movement of said bellows alternatively causing said test chamber pressure to be unequal to said internal test object pressure; and
    at least one sensing device operatively coupled with said variable size gas space chamber to sense changes in said test chamber pressure over a specified time duration wherein said internal test object pressure and said test chamber pressure are identified by readings of said sensing device producing values that define a pressure value curve which indicates the presence or absence of a leak in said hermetically sealed object under test.

2. The apparatus of claim 1 wherein said measurable test chamber pressure is selected from a group consisting of gas pressure, negative gas pressure and gas density.

3. The apparatus of claim 1 wherein the size of said variable size gas space test chamber is selectively compressed to correspond to a size of the hermetically sealed object under test to produce an optimized gas space in said hermetically sealed object under test.

4. The apparatus of claim 1 wherein said flexible housing surrounding said variable size gas space test chamber is comprised of said at least one expandable and contractible bellows.

5. The apparatus of claim 1 which further includes at least one sealing component selected from a group consisting of epoxy, gasket, o-rings, glue, a non-movable plate, a movable plate, a welded joint, a plunger, a contoured component, a geometrically interlocking component, a viscious material, a chamber cap and a magnetic interface, wherein said sealing component is used to seal said variable size gas space test chamber.

6. The apparatus of claim 1 wherein said variable size gas space chamber includes at least one partition placed within a gas space of said variable size gas space test chamber to reduce said gas space space of said chamber.

7. The apparatus of claim 6 wherein said at least one partition is comprised of a non-permeable material placed within said variable size gas space test chamber.

8. The apparatus of claim 6 wherein said at least one partition is placed inside said variable size gas space test chamber to form an upper gas chamber and a lower gas chamber within said variable size gas space test chamber.

9. The apparatus of claim 8 wherein said at least one expandable and contractible bellows comprises a first bellows and a second bellows, and said at least one variable size gas space test chamber comprises a first variable size gas space test chamber and a second variable size gas space test chamber wherein said first variable size gas space test chamber has a first variable gas space size dependent on a position of said first bellows along a lateral axis of movement and said second variable size gas space test chamber has a second variable gas space size dependent on a position of said second bellows along the lateral axis of movement.

10. The apparatus of claim 8 wherein said upper gas chamber has a first variable gas space pressure and said lower gas chamber has a second variable gas space pressure, and further wherein said first variable gas space pressure is different from said lower gas space pressure.

11. The apparatus of claim 10 wherein said at least one sensing device comprises a plurality of sensing devices, and said variable size gas space test chamber is operatively coupled with said plurality of sensing devices wherein said plurality of sensing devices repeatedly measure changes in gas states selected from a group consisting of gas pressure, gas density and gas composition.

12. The apparatus of claim 8 wherein said upper gas chamber and said lower gas chamber are operatively and independently coupled to a vacuum inducing device capable of changing a volume of a gas space within said upper gas chamber and said lower gas chamber.

13. The apparatus of claim 8 wherein said upper gas chamber and said lower gas chamber are operatively and independently coupled to a pressure inducing device capable of changing a pressure of a gas space within said upper gas chamber and said lower gas chamber.

14. The apparatus of claim 6 wherein said at least one partition is an o-ring.

15. The apparatus of claim 14 wherein said at least one variable size gas space test chamber comprises a plurality of variable size gas space test chambers, and further wherein each of said plurality of variable size gas space test chambers has a gas space pressure that is independent of a variable gas space pressure of rest of said plurality of variable size gas space test chambers.

16. The apparatus of claim 6 which further includes a plurality of spaced partitions to form two or more variable size space gas test chambers.

17. The apparatus of claim 16 wherein each of said two or more variable size gas space test chambers has a gas space pressure that is independently used for testing a portion of said hermetically sealed object under test.

18. The apparatus of claim 1 wherein said at least one expandable and contractible bellows has a ripple diaphragm configuration.

19. The apparatus of claim 1 wherein said at least one expandable and contractible bellows has dimensions ranging from ⅛-inch to 54-inches.

20. The apparatus of claim 1 wherein said at least one expandable and contractible bellows is non-cylindrical.

\* \* \* \* \*